(12) United States Patent
Miyoshi

(10) Patent No.: US 8,447,244 B2
(45) Date of Patent: May 21, 2013

(54) COMMUNICATION TERMINAL DEVICE AND COMMUNICATION RELAY METHOD

(75) Inventor: Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/345,455

(22) Filed: Dec. 29, 2008

(65) Prior Publication Data

US 2009/0135933 A1    May 28, 2009

Related U.S. Application Data

(63) Continuation of application No. 10/591,707, filed on Sep. 6, 2006, now Pat. No. 7,505,735.

(30) Foreign Application Priority Data

Mar. 11, 2004  (JP) ................................ 2004-068793
Mar. 1, 2005   (JP) ................................ 2005-056381

(51) Int. Cl.
    *H04B 1/034* (2006.01)
(52) U.S. Cl.
    USPC ........................................................ 455/100
(58) Field of Classification Search
    USPC ........................................................ 455/100
    See application file for complete search history.

(56) References Cited

U.S. PATENT DOCUMENTS

| | | | | |
|---|---|---|---|---|
| 5,046,006 A | * | 9/1991 | Revord et al. ...................... 89/1.1 |
| 5,280,541 A | * | 1/1994 | Marko et al. .................. 455/462 |
| 5,382,958 A | * | 1/1995 | FitzGerald .................... 342/386 |
| 5,504,775 A | | 4/1996 | Chouly |
| 5,561,664 A | * | 10/1996 | Gilmore et al. ............... 370/252 |
| 5,659,882 A | | 8/1997 | Fukutomi |
| 5,668,808 A | * | 9/1997 | Sato ............................. 370/378 |
| 5,793,769 A | * | 8/1998 | Murono et al. ............... 370/401 |
| 5,883,884 A | * | 3/1999 | Atkinson ....................... 370/279 |
| 6,028,894 A | * | 2/2000 | Oishi et al. ..................... 375/227 |
| 6,031,827 A | * | 2/2000 | Rikkinen et al. .............. 370/330 |
| 6,430,156 B1 | * | 8/2002 | Park et al. ..................... 370/232 |

(Continued)

FOREIGN PATENT DOCUMENTS

| | | |
|---|---|---|
| DE | 101 45 759 | 4/2003 |
| JP | 7-162935 | 6/1995 |

(Continued)

OTHER PUBLICATIONS

Russian Office Action dated Nov. 14, 2008 with English translation.

(Continued)

*Primary Examiner* — Hai V Nguyen
(74) *Attorney, Agent, or Firm* — Dickinson Wright PLLC

(57) ABSTRACT

There is provided a mobile station device in a multi-hop system capable of realizing relay of communication of another station while suppressing increase of power consumption of the local station. In this device, at timing t1, a mobile station MS2 transmits data S2 destined to a base station BS1, to a mobile station MS1. The mobile station MS1 receives the data S2 and temporarily stores it in a buffer. The mobile station MS1 waits until timing t4 when the data S1 of the mobile station MS1 is to be transmitted. When this timing has come, the data S2 stored in the buffer is multiplexed with the data S1 of the mobile station MS1 and transmitted to the base station BS1.

10 Claims, 11 Drawing Sheets

U.S. PATENT DOCUMENTS

| | | | |
|---|---|---|---|
| 6,519,651 B1 * | 2/2003 | Dillon | 709/250 |
| 6,618,368 B1 * | 9/2003 | Tanigawa et al. | 370/352 |
| 6,633,901 B1 * | 10/2003 | Zuili | 709/203 |
| 6,640,087 B2 | 10/2003 | Reed | |
| 6,717,930 B1 * | 4/2004 | Sezgin et al. | 370/335 |
| 6,731,905 B2 * | 5/2004 | Ogino et al. | 455/11.1 |
| 6,873,611 B2 | 3/2005 | Rios | |
| 6,961,757 B2 * | 11/2005 | Ueda | 709/206 |
| 6,978,152 B1 * | 12/2005 | Yamaashi et al. | 455/526 |
| 7,020,184 B2 * | 3/2006 | Yuen | 375/152 |
| 7,069,011 B2 * | 6/2006 | Dalal et al. | 455/450 |
| 7,088,990 B1 * | 8/2006 | Isomursu et al. | 455/412.1 |
| 7,095,722 B1 * | 8/2006 | Walke et al. | 370/315 |
| 7,095,754 B2 * | 8/2006 | Benveniste | 370/465 |
| 7,099,695 B1 * | 8/2006 | Ngan | 455/562.1 |
| 7,123,910 B2 | 10/2006 | Lucidarme | |
| 7,139,527 B2 * | 11/2006 | Tamaki et al. | 455/16 |
| 7,149,239 B2 | 12/2006 | Hudson | |
| 7,180,875 B1 * | 2/2007 | Neumiller et al. | 370/329 |
| 7,187,655 B1 * | 3/2007 | Sato et al. | 370/252 |
| 7,191,273 B2 * | 3/2007 | Weber | 710/244 |
| 7,197,685 B2 * | 3/2007 | Limberg | 714/756 |
| 7,221,268 B2 * | 5/2007 | Sayers et al. | 340/539.1 |
| 7,280,073 B2 * | 10/2007 | Sayers | 342/432 |
| 7,283,483 B2 * | 10/2007 | Asawa et al. | 370/252 |
| 7,321,578 B2 | 1/2008 | Rios | |
| 7,349,665 B1 * | 3/2008 | Zhu et al. | 455/11.1 |
| 7,400,856 B2 * | 7/2008 | Sartori et al. | 455/7 |
| 7,406,140 B2 * | 7/2008 | Kunieda et al. | 375/346 |
| 7,471,927 B2 * | 12/2008 | Chen et al. | 455/39 |
| 7,480,486 B1 * | 1/2009 | Oh et al. | 455/7 |
| 7,508,798 B2 * | 3/2009 | Tong et al. | 370/337 |
| 7,519,029 B2 * | 4/2009 | Takeda et al. | 370/335 |
| 7,522,552 B2 * | 4/2009 | Fein et al. | 370/328 |
| 7,558,554 B2 * | 7/2009 | Hoo et al. | 455/277.1 |
| 7,570,662 B2 * | 8/2009 | Chinnaiah et al. | 370/473 |
| 7,734,250 B2 * | 6/2010 | Sommer | 455/11.1 |
| 7,782,750 B2 * | 8/2010 | Yamaura et al. | 370/206 |
| 7,801,482 B2 * | 9/2010 | Chen et al. | 455/39 |
| 7,813,695 B2 * | 10/2010 | Haartsen | 455/11.1 |
| 7,853,204 B2 * | 12/2010 | Tan et al. | 455/13.1 |
| 7,853,294 B1 * | 12/2010 | Ngan | 455/562.1 |
| 7,881,741 B2 * | 2/2011 | Horiuchi et al. | 455/522 |
| 7,970,349 B2 * | 6/2011 | Chen et al. | 455/39 |
| 8,090,311 B2 * | 1/2012 | Matsumura | 455/11.1 |
| 2001/0024468 A1 * | 9/2001 | Miyashita et al. | 375/228 |
| 2001/0053141 A1 * | 12/2001 | Periyalwar et al. | 370/337 |
| 2002/0032031 A1 * | 3/2002 | Ogino et al. | 455/435 |
| 2002/0114270 A1 * | 8/2002 | Pierzga et al. | 370/208 |
| 2002/0137464 A1 | 9/2002 | Dolgonos | |
| 2002/0160765 A1 | 10/2002 | Okajima | |
| 2002/0183083 A1 | 12/2002 | Nagira | |
| 2003/0002539 A1 * | 1/2003 | Soda et al. | 370/509 |
| 2003/0032420 A1 | 2/2003 | Kuhn | |
| 2003/0039317 A1 * | 2/2003 | Taylor et al. | 375/295 |
| 2003/0043887 A1 | 3/2003 | Hudson | |
| 2003/0109285 A1 | 6/2003 | Reed | |
| 2003/0124976 A1 * | 7/2003 | Tamaki et al. | 455/15 |
| 2003/0125067 A1 * | 7/2003 | Takeda et al. | 455/522 |
| 2003/0153264 A1 * | 8/2003 | Osato et al. | 455/3.06 |
| 2003/0161326 A1 * | 8/2003 | Pazhyannur et al. | 370/395.52 |
| 2003/0165127 A1 | 9/2003 | Fujiwara | |
| 2003/0224731 A1 * | 12/2003 | Yamaura et al. | 455/63.3 |
| 2004/0005861 A1 * | 1/2004 | Tauchi | 455/11.1 |
| 2004/0023652 A1 | 2/2004 | Shah | |
| 2004/0029528 A1 * | 2/2004 | Chandler | 455/12.1 |
| 2004/0114618 A1 | 6/2004 | Tong | |
| 2004/0125775 A1 | 7/2004 | Rios | |
| 2004/0125820 A1 | 7/2004 | Rios | |
| 2004/0131025 A1 | 7/2004 | Dohler | |
| 2004/0202109 A1 * | 10/2004 | Akiyama et al. | 370/235 |
| 2005/0041693 A1 * | 2/2005 | Priotti | 370/503 |
| 2005/0059342 A1 * | 3/2005 | Engels et al. | 455/7 |
| 2005/0108374 A1 * | 5/2005 | Pierzga et al. | 709/223 |
| 2005/0141545 A1 * | 6/2005 | Fein et al. | 370/445 |
| 2005/0141593 A1 * | 6/2005 | Pasanen et al. | 375/130 |
| 2005/0190830 A1 * | 9/2005 | Miyashita et al. | 375/228 |
| 2005/0201368 A1 * | 9/2005 | Periyalwar et al. | 370/356 |
| 2005/0232183 A1 * | 10/2005 | Sartori et al. | 370/319 |
| 2006/0025071 A1 * | 2/2006 | Yamazaki et al. | 455/11.1 |
| 2007/0019664 A1 * | 1/2007 | Benveniste | 370/445 |
| 2007/0064588 A1 * | 3/2007 | Kisoda et al. | 370/208 |
| 2007/0195831 A1 * | 8/2007 | Tanaka | 370/537 |
| 2008/0032697 A1 * | 2/2008 | Sommer | 455/445 |
| 2008/0075178 A1 * | 3/2008 | Lappetelainen et al. | 375/260 |
| 2008/0125109 A1 * | 5/2008 | Larsson et al. | 455/424 |
| 2008/0188177 A1 * | 8/2008 | Tan et al. | 455/11.1 |
| 2008/0291856 A1 * | 11/2008 | Li et al. | 370/311 |
| 2009/0131096 A1 * | 5/2009 | Chen et al. | 455/522 |
| 2009/0212226 A1 * | 8/2009 | Britton et al. | 250/370.07 |

FOREIGN PATENT DOCUMENTS

| | | |
|---|---|---|
| JP | 07221696 | 8/1995 |
| JP | 11289349 | 10/1999 |
| JP | 2000165937 | 6/2000 |
| JP | 2001076278 | 3/2001 |
| JP | 2001148702 | 5/2001 |
| JP | 2003234717 | 8/2003 |
| JP | 2003-264498 | 9/2003 |
| JP | 2004-15746 | 1/2004 |
| WO | 03/055246 | 7/2003 |
| WO | WO 2006043902 A1 * | 4/2006 |
| WO | WO 2006043903 A1 * | 4/2006 |

OTHER PUBLICATIONS

PCT International Search Report dated Jun. 21, 2005.
Office Action in the corresponding Japanese Patent Application dated Jul. 20, 2010.

* cited by examiner

UPLINK/DOWNLINK BETWEEN
BS1 AND MS1
FIG.2A
| t1 | t2 | t3 | t4 | t5 | t6 | t7 | t8 |
|----|----|----|----|----|----|----|----|
| ↓ | ↑ | ↓ | ↑ | ↓ | ↑ | ↓ | ↑ |
TRANSMISSION SIGNAL OF MS2
(RECEIVED SIGNAL OF MS1)
FIG.2B
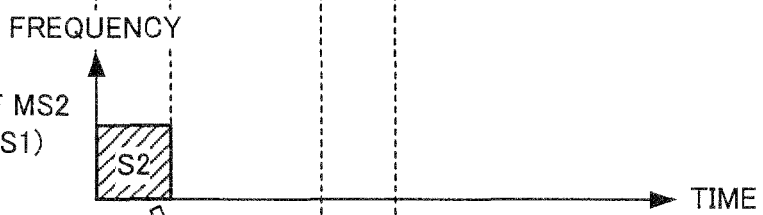
TRANSMISSION SIGNAL OF MS1
FIG.2C
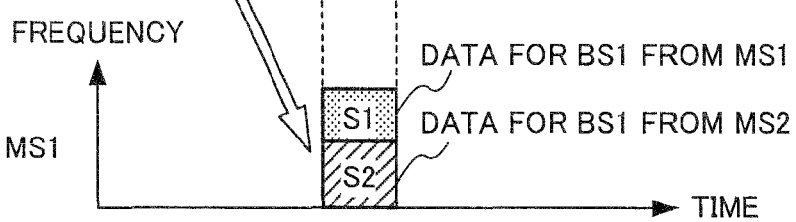

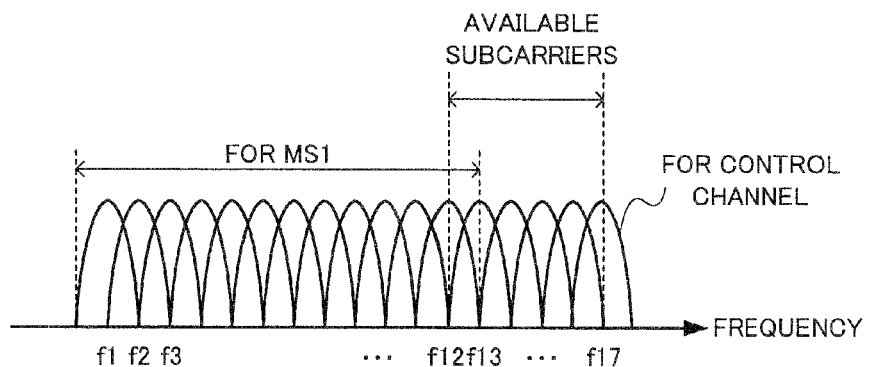
FIG.3
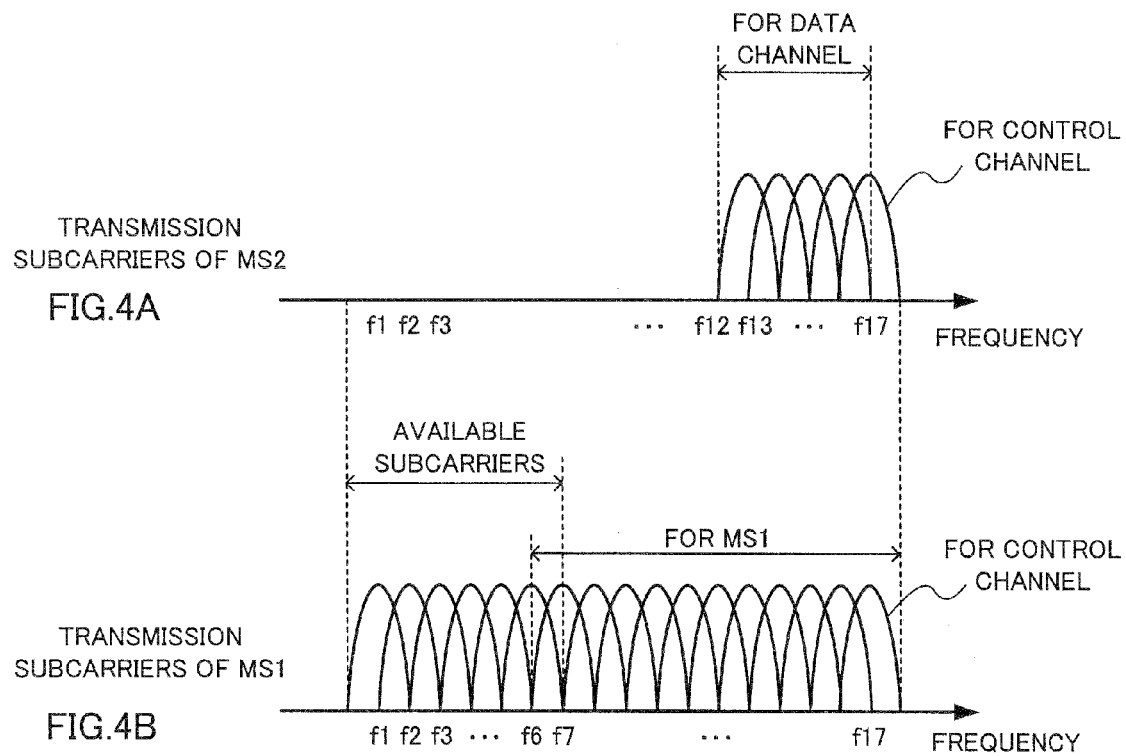
FIG.4A
FIG.4B

UPLINK/DOWNLINK
BETWEEN BS1 AND MS1
FIG.7A
TRANSMISSION SIGNAL OF BS1
(RECEIVED SIGNAL OF MS1)
FIG.7B
TRANSMISSION SIGNAL OF MS1
FIG.7C
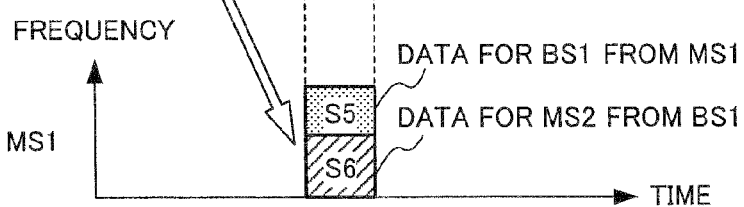
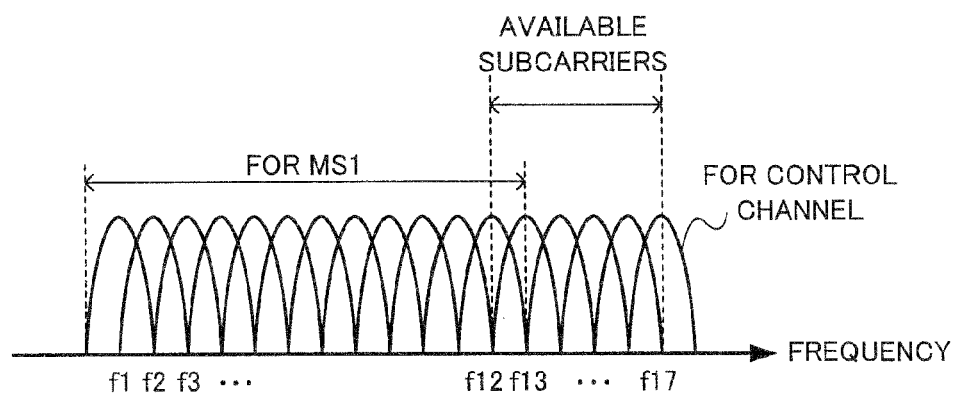
FIG.8

COMMUNICATION TERMINAL DEVICE AND COMMUNICATION RELAY METHOD

This is a continuation application of application Ser. No. 10/591,707 filed Sep. 6, 2006, which is a national phase application under 35 USC 371 of PCT/JP2005/004000 filed Mar. 8, 2005, which is based on Japanese application number 2004-068793 filed Mar. 11, 2004 and Japanese application number 2005-056381 filed Mar. 1, 2005, the entire contents of each of which are incorporated by reference herein.

TECHNICAL FIELD

The present invention relates to a communication terminal apparatus and communication relay method in a multihop system adopting an OFDM (Orthogonal Frequency Division Multiplex) scheme.

BACKGROUND ART

In a mobile communication system as typified by a mobile telephone or the like, with the development of multimedia information, large volume data such as still image and moving image, as well as speech data, has been processed. In the future, since it is expected that the data volume will further increase, it is actively studied to realize high transmission rate by making frequency band of a radio signal higher.

However, since a radio signal of high frequency is largely attenuated depending on transmission distance, the radius of a cell covered by a base station becomes small, and therefore it is necessary to install more base stations. In a high population density area, sufficient cost effectiveness can be obtained if more base stations are installed, and therefore the problem cannot be exposed. However, in a low population density area, for example, it is impractical to install base stations every few hundred meters. Therefore, in a low population density area, it is desired to enable communication between base stations and communication terminals without increasing the number of base stations.

As a means for solving this problem, there is a technology called a multihop system (or multihop network) (for example, refer to Patent Document 1.) In this multihop system, each communication terminal has a communication relay function and relays communication between another communication terminal and a base station. Therefore, a communication terminal that is located outside the communication area (outside a cell) and cannot directly communicate with the base station (hereinafter referred to as a "relay requesting station") requests another communication terminal that can directly communicate with the base station to relay communication. Then, the communication terminal requested to relay communication (hereinafter referred to as a "relay station") establishes a link to the base station, and relays communication between the communication terminal outside the area and the base station. By this means, the communication terminal outside the area can communicate with the base station.
Patent Document 1: Japanese Patent Application Laid-Open No. HEI11-289349

DISCLOSURE OF INVENTION

Problems to be Solved by the Invention

However, in the conventional multihop system, even if the subject station (relay station) does not perform communication, a circuit of the subject station is used for communication of another station outside the area (relay requesting station), and therefore, there is a problem that power consumption of the subject station increases. In particular, a communication terminal located at a cell edge (area near the boundary with a neighboring cell) has a high possibility of performing a relay for the communication terminal outside the area, and therefore power consumption increases prominently.

It is therefore an object of the present invention to provide a communication terminal apparatus, in a multihop system, capable of relaying communication of another station and suppressing increase in power consumption of the communication terminal apparatus, and provide a communication relay method used in the communication terminal apparatus.

Means for Solving the Problem

A communication terminal apparatus of the present invention that relays communication between a base station and another communication terminal in a communication system of an OFDM scheme, adopts a configuration having: a storage section that stores communication data between the base station and another communication terminal; and a transmission section that frequency division multiplexes the stored communication data with data of the communication terminal apparatus and transmits the frequency division multiplexed data at a timing for transmitting the data of the communication terminal apparatus.

A communication system of the present invention is a communication system of an OFDM scheme having a base station and a plurality of communication terminals, wherein, when a first communication terminal is requested to relay communication with the base station from a second communication terminal, the first communication terminal temporarily stores relay data and frequency division multiplexes the relay data with data of the first communication terminal, transmits the frequency division multiplexed data at a timing for transmitting the data of the first communication terminal, and reports the relay to the second communication terminal, and, when the second communication terminal receives the report of the relay from the first communication terminal, the second communication terminal reports the relay to a user of the second communication terminal.

Advantageous Effect of the Invention

According to the present invention, in the multihop system, it is possible to relay communication between a communication terminal located outside the area and a base station, and suppress increase in power consumption of the communication terminal.

BRIEF DESCRIPTION OF DRAWINGS

FIG. 2A shows timings of uplink communication/downlink communication in a TDD system, FIG. 2B is a view showing a transmission signal of a mobile station outside the area, and FIG. 2C is a view showing a transmission signal of a relay station;

FIG. 3 shows an example of a usage state of transmission subcarriers of a relay station;

FIG. 4 shows an example of a relationship between transmission subcarriers of a mobile station outside the area and available subcarriers of a relay station;

FIG. 7A shows timings of uplink communication/downlink communications in a TDD system, FIG. 7B shows a transmission signal of a base station, and FIG. 7C shows a transmission signal of a relay station;

FIG. 8 shows an example of a usage state of transmission subcarriers for a relay station;

BEST MODE FOR CARRYING OUT THE INVENTION

Embodiments of the present invention will be described below in detail with reference to the accompanying drawings. As an example of a communication terminal apparatus, a case will be explained where a mobile station apparatus such as a mobile telephone is used.

Embodiment 1

One aspect of the present invention is that, in the multihop system, even when a mobile station is requested to perform a relay from another mobile station, the mobile station does not always perform the relay, and the cases of performing a relay are limited.

Specifically, the mobile station according to Embodiment 1 of the present invention is located in a location where direct communication with a base station is possible in the multipop system adopting an OFDM-TDD (Orthogonal Frequency Division Multiplex—Time Division Duplex) system. When a mobile station according to this embodiment is requested to relay communication with the above-described base station from another mobile station located outside the area, the mobile station performs a relay in the following limited cases. In addition, for easy understanding, uplink communication between a mobile station outside the area and a base station is referred to as "uplink relay", downlink communication between a mobile station outside the area and the base station is referred to as "downlink relay", and uplink relay and downlink relay will be explained separately.

Figure 1:
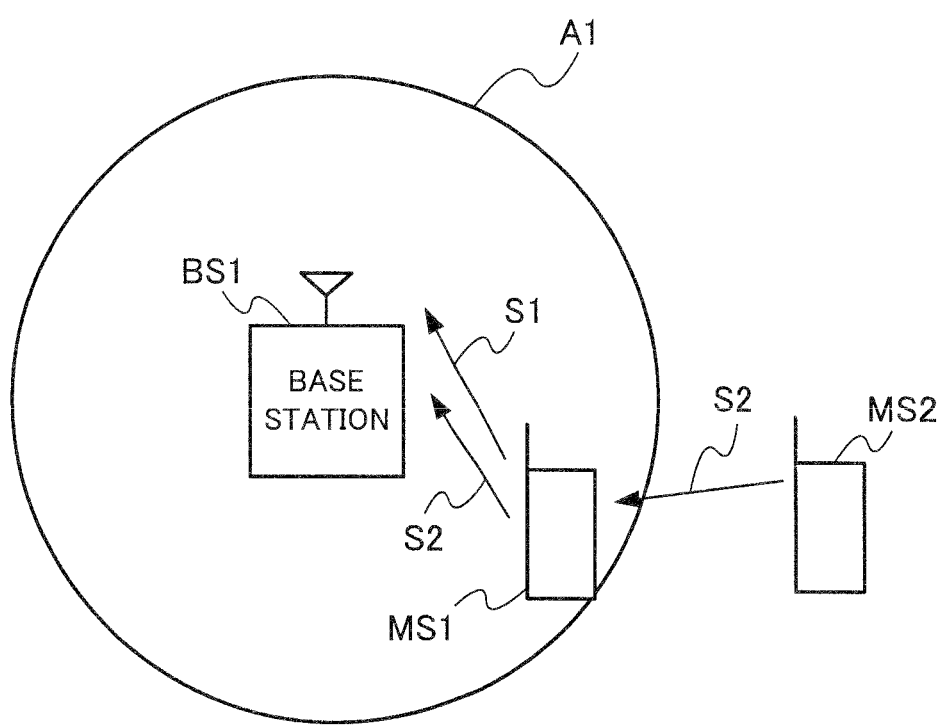
FIG. 1 illustrates a case in which a mobile station within a cell relays uplink communication between a mobile station located outside the cell and a base station.

FIG. 1 illustrates a case in which mobile station (relay station) MS1 within a cell relays uplink communication between mobile station (relay requesting station) MS2 located outside cell A1 and base station BS1, that is, a case of uplink relay.

In uplink, the cases in which mobile station MS1 performs relay are limited as follows. That is, at the timing when mobile station MS1 transmits data to base station BS1, mobile station MS1 relays transmission data from mobile station MS2 to base station BS1. To be more specific, mobile station MS1 transmits transmission data S2 transmitted from mobile station MS2 to base station BS1 together with transmission data S1 of mobile station MS1.

FIG. 2A to FIG. 2C illustrate a timing when mobile station MS1 relays data of mobile station MS2.

FIG. 2A shows uplink communication/downlink communication timings between base station BS1 and mobile station MS1, that is, uplink communication/downlink communication timings in a TDD system. In this figure, downward arrows indicate downlink communication, and upward arrows indicate uplink communication. Furthermore, FIG. 2B shows a transmission signal of mobile station MS2 outside the area (received signal of relay station MS1), and FIG. 2C shows a transmission signal of relay station MS1.

As shown in FIG. 2B, mobile station MS2 transmits data S2 for base station BS1 to mobile station MS1 at downlink communication timing t1 in a cellular system (TDD system) of base station BS1. Here, although a case is described as an example in which mobile station MS2 is synchronized with a TDD system, mobile station MS2 does not necessarily have to be synchronized.

Mobile station MS1 receives data S2 and temporarily stores data S2 in a buffer. Then, as shown in FIG. 2C, after waiting until timing t4 of transmitting data S1 of mobile station MS1 comes, and at timing t4, mobile station MS1 multiplexes data S2 stored in the buffer with data S1 of mobile station MS1 and transmits the multiplexed data to base station BS1. When a waiting time of the data relay exceeds a predetermined time, mobile station MS1 discards this relay data and does not perform relay.

Then, mobile station MS1 confirms whether or not there is an unused subcarrier in OFDM frequencies, that is, a subcarrier to which transmission data for base station BS1 of mobile station MS1 or a control channel signal is not mapped among available subcarriers when mobile station MS1 performs transmission (available subcarrier). Then, if there is an available subcarrier, mobile station MS1 determines whether the available subcarrier has enough capacity for a data relay (whether the capacity of available subcarrier is larger than the size of relay data). If there is not enough capacity for a data relay, mobile station MS1 does not perform a relay.

FIG. 3 shows an example of a usage state of transmission subcarriers for relay station MS1.

In this example, subcarriers having center frequencies f1 to f12 are subcarriers to which transmission data of mobile station MS1 is mapped (subcarreirs for MS1), and a subcarrier of center frequency f17 is a subcarrier to which a control channel is mapped. Therefore, subcarriers having center frequencies f13 to f16 are the above-described available subcarriers.

Then, since there are available subcarriers, mobile station MS1 confirms the capacity of these available subcarriers and relays communication between mobile station MS2 and base station BS1. To be more specific, mobile station MS1 maps data which is requested to be transmitted from mobile station MS2 to base station BS1, to the above-described available subcarriers. Here, when the frequencies of transmission subcarriers for mobile station MS2 are covered by (included in) the frequencies of available subcarriers for mobile station MS1, mobile station MS1 maps data of mobile station MS2 to subcarriers with the frequency as it is.

Then, after mobile station MS1 multiplexes subcarriers to which data of mobile station MS2 is mapped with subcarriers to which data of mobile station MS1 is mapped and obtains a multicarrier signal, mobile station MS1 transmits this multicarrier signal to base station BS1.

In addition, when the frequencies of transmission subcarriers for mobile station MS2 are not covered by the frequencies of available subcarriers for mobile station MS1, mobile station MS1 changes frequency as described below. FIG. 4 shows an example of a relationship between transmission subcarriers for mobile station (relay requesting station) MS2 outside the area and available subcarriers for relay station MS1, that is, a case in which both subcarriers have the above relationship. Here, FIG. 4A shows transmission subcarriers for mobile station (relay requesting station) MS2, and FIG. 4B shows available subcarriers for relay station MS1.

In an example of this figure, while the range of center frequencies of transmission subcarriers for mobile station MS2 outside the area is between f13 and f16, the range of center frequencies of available subcarriers for relay station MS1 is between f1 and f6. In this way, the frequencies of transmission subcarriers for a mobile station which requests a relay are not always covered (included) by the frequencies of available subcarriers for the relay station. In this case, relay station MS1 maintains (fixes) the frequencies of transmission subcarriers for relay station MS1, and shifts the frequencies of transmission subcarriers for relay data so that the frequencies of transmission subcarriers for the relay data are included within the frequency range of available subcarriers. In the example of FIG. 4, the range of center frequencies of relay data subcarriers change from f13 and f16 to f1 and f6. By this means, mobile station MS1 can smoothly relay data. Furthermore, since relay station MS1 does not change the frequencies of transmission subcarriers for relay station MS1, for example, even in a communication system such as frequency scheduling in which subcarriers are assigned to use in advance to each mobile station, the frequency scheduling functions effectively.

Figure 5:
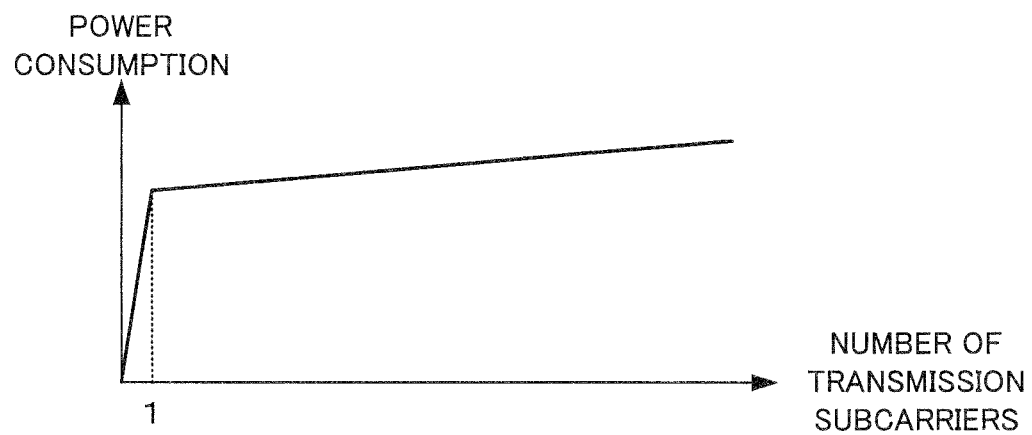
FIG. 5 shows a relationship between the number of transmission subcarriers and power consumption.

Next, the effects of adopting the above communication relay method will be described. FIG. 5 shows a relationship between the number of transmission subcarriers for a mobile station and power consumption.

As shown in this figure, if there is at least one transmission subcarrier (actually transmitted subcarrier), power consumption of the mobile station substantially increases compared to the case where there is no transmission subcarrier. However, when the number of transmission subcarriers further increases, increase in power consumption slows down, and, even if the number of transmission subcarriers increases, power consumption does not change substantially compared to the case where the number of transmission subcarriers is one.

Consequently, when mobile station MS1 performs transmission—that is, when the number of transmission subcarriers is 1 or more—mobile station (relay station) MS1 according to this embodiment maps data of another station (such as mobile station MS2) to available subcarriers and transmits the subcarriers. If such transmission is performed, it can be seen from FIG. 5 that power consumption of mobile station MS1 increases little. Furthermore, as described above, relay station MS1 continues mapping relay data to available subcarriers, and does not change the frequencies of transmission subcarriers for relay station MS1. That is, even if relay station MS1 has a function of relaying data, relay station MS1 transmits data of relay station MS1 as a first priority. Therefore, it can be seen that relay station MS1 is influenced little by relaying data.

Figure 6:
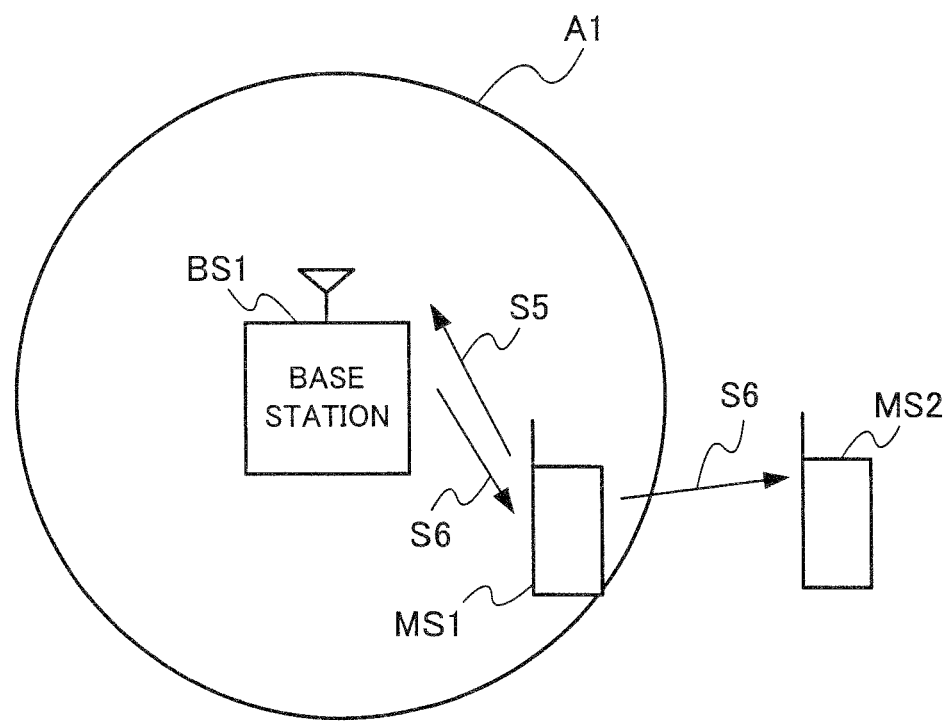
FIG. 6 illustrates a case in which a mobile station within a cell relays downlink communication between a mobile station outside the area and a base station.

FIG. 6 illustrates a case in which mobile station (relay station) MS1 within the cell relays downlink communication between mobile station (relay requesting station) MS2 outside the area and base station BS1, that is, a case of downlink relay.

In downlink, cases in which mobile station MS1 performs relay are limited as follows. That is, at the timing when mobile station MS1 transmits data to base station BS1, mobile station MS1 relays transmission data for mobile station MS2 from base station BS1. To be more specific, mobile station MS1 transmits transmission data S6 transmitted from base station BS1 to mobile station MS2 at the same timing as the timing for transmission data S5 of mobile station MS1.

FIGS. 7A to 7C illustrate a timing when mobile station MS1 relays data of base station BS1.

FIG. 7A shows uplink communication/downlink communication timings in a TDD system. Furthermore, FIG. 7B shows a transmission signal of base station BS1 (received signal at relay station MS1), and FIG. 7C shows a transmission signal at relay station MS1.

As shown in FIG. 7B, at timing t11, base station BS1 transmits data S6 for mobile station MS2 to mobile station MS1. Mobile station MS1 receives this data S6 and temporarily stores data S6 in a buffer. Then, as shown in FIG. 7C, after waiting until the timing for transmitting data S5 of mobile station MS1 to base station BS1—that is, uplink communication timing t14—and at this timing t14, mobile station MS1 multiplexes relay data S6 stored in the buffer with data S5 of mobile station MS1 and transmits the multiplexed data.

Relay data S6 is downlink relay data though transmitted at uplink communication timing t14. Therefore, mobile station MS2 receiving this relay data S6 needs to perform reception processing at an uplink communication timing.

Furthermore, at this time, as described in uplink communication, mobile station MS1 determines whether or not there is an available subcarrier in OFDM frequencies.

FIG. 8 shows an example of a usage state of transmission subcarriers for relay station MS1.

In this example, subcarriers for center frequencies f13 to f16 are available subcarriers (subcarriers for base station BS1). Then, mobile station MS1 maps data for mobile station MS2 from base station BS1 to the available subcarriers, and multiplexes the subcarriers with subcarriers to which data for base station BS1 from mobile station MS1 is mapped and transmits the subcarriers.

Figure 9:
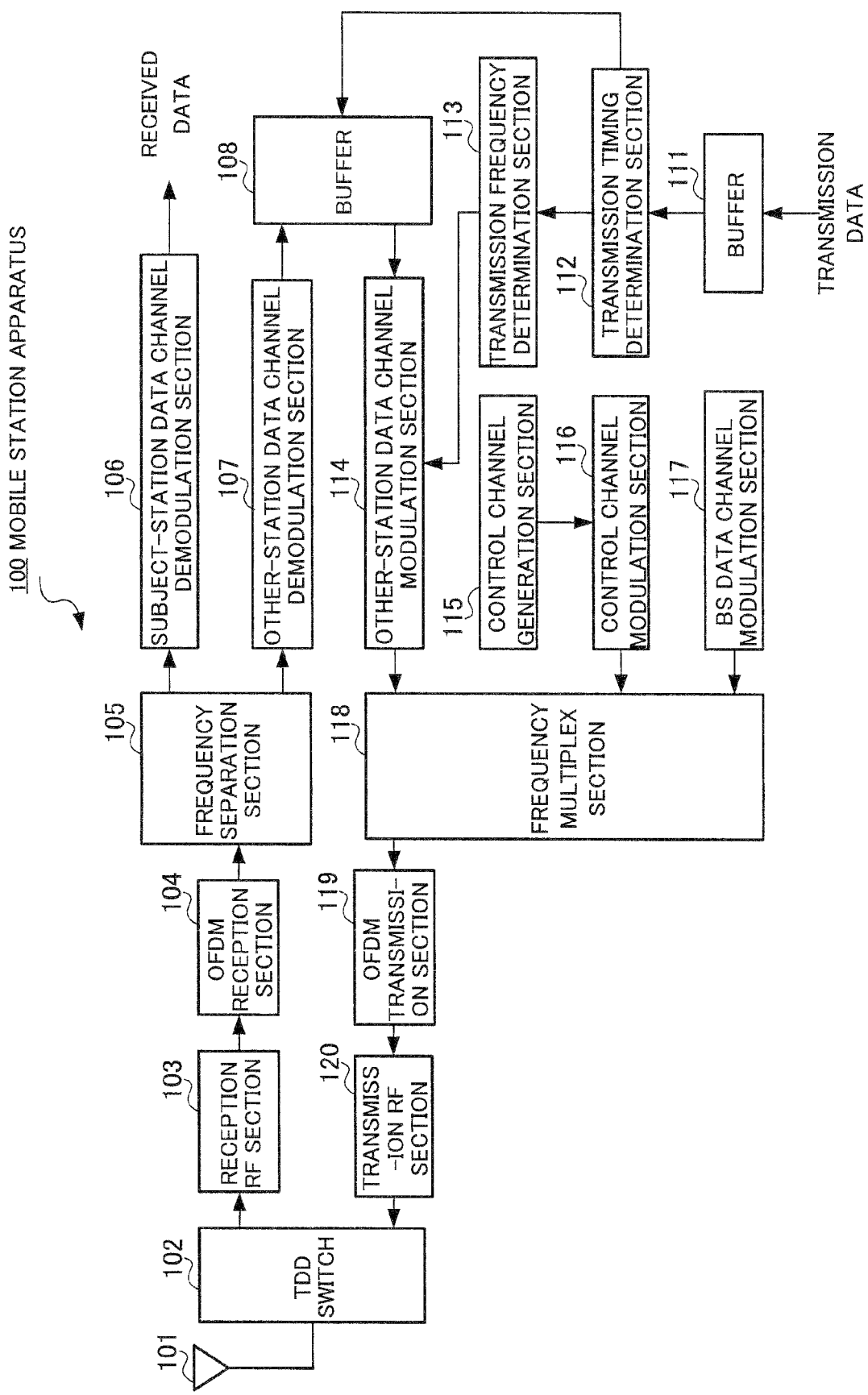
FIG. 9 is a block diagram showing a main configuration of a mobile station apparatus according to Embodiment 1.

FIG. 9 is a block diagram showing a main configuration of mobile station MS1 (mobile station apparatus 100) according to this embodiment implementing the above-described operations.

Sections of this mobile station apparatus 100 implement the following operations:

Antenna 101 receives a radio signal from another station (base station BS1 or another mobile station such as mobile station MS2), and transmits a radio signal from mobile station MS1. TDD switch 102 switches between transmission and reception of the radio signal in synchronization with uplink/downlink timings in the TDD system. Reception RF section 103 performs predetermined radio reception processing such as down-conversion on the radio signal received via antenna 101, and obtains a baseband signal. OFDM reception section 104 performs predetermined OFDM reception processing such as inverse fast Fourier transform (IFFT) on the baseband signal, and obtains subcarrier signals from the multicarrier baseband signal.

Frequency separation section 105 separates subcarrier signals by frequency (refer to FIG. 3 and FIG. 8), and separates data for mobile station MS1 from data for another station. Subject-station data channel demodulation section 106 demodulates data for mobile station MS1 and obtains received data for mobile station MS1. Other-station data channel demodulation section 107 demodulates data for another station and temporarily stores this demodulated data in buffer 108.

On the other hand, when transmission data is generated, buffer 111 temporarily stores the data.

Transmission timing determination section 112 determines a timing for transmitting data of mobile station MS1 in accordance with the uplink/downlink timing in the TDD system, reads the stored transmission data from buffer 111 according to this timing, and outputs the transmission data to transmission frequency determination section 113. Furthermore, transmission timing determination section 112 reports the transmission timing of mobile station MS1 to buffer 108.

Transmission frequency determination section 113 determines frequencies (subcarriers) needed to transmit this data based on the transmission data size or the like outputted from transmission timing determination section 112, and determines subcarriers needed to transmit a control channel. Furthermore, when there are available subcarriers as already described using FIG. 3 and FIG. 8, transmission frequency determination section 113 reports the presence of available subcarriers and information about these available subcarriers to other-station data channel modulation section 114. Furthermore, transmission frequency determination section 113 reports information about the subcarriers use by mobile station MS1 and available subcarriers, to control channel generation section 115.

Buffer 108 outputs the stored data for another station to other-station data channel modulation section 114 based on the transmission timing of mobile station MS1 reported from transmission timing determination section 112.

When the presence of available subcarriers is reported from transmission frequency determination section 113, other-station data channel modulation section 114 performs predetermined modulation processing such as QPSK on data for another station outputted from buffer 108 and outputs the result to frequency multiplex section 118.

Control channel generation section 115 generates a control channel signal reporting the information about the subcarriers used by mobile station MS1 and available subcarriers reported from transmission frequency determination section 113, and outputs the control channel signal to control channel modulation section 116.

Control channel modulation section 116 performs predetermined modulation processing such as QPSK on the control channel signal and outputs the result to frequency multiplex section 118. BS data channel modulation section 117 performs predetermined modulation processing such as QPSK on data for base station BS1 from mobile station MS1 and outputs the result to frequency multiplex section 118.

Frequency multiplex section 118 maps modulation signals outputted from other-station data channel modulation section 114, control channel modulation section 116 and BS data channel modulation section 117 to subcarriers determined by frequency determination section 113, and thereby obtains the transmission signal multiplexed on the frequency axis, and outputs the transmission signal to OFDM transmission section 119.

OFDM transmission section 119 performs predetermined OFDM transmission processing such as fast Fourier transform (FFT) on the transmission signal and obtains a multicarrier baseband signal. Transmission RF section 120 performs predetermined radio transmission processing such as up-conversion on this baseband signal and transmits the obtained radio signal via TDD switch 102 and antenna 101.

In addition, mobile station MS1 includes an identifier of mobile station MS1 in relay data so that base station BS1 can recognize the data relay from another mobile station.

Figure 10:
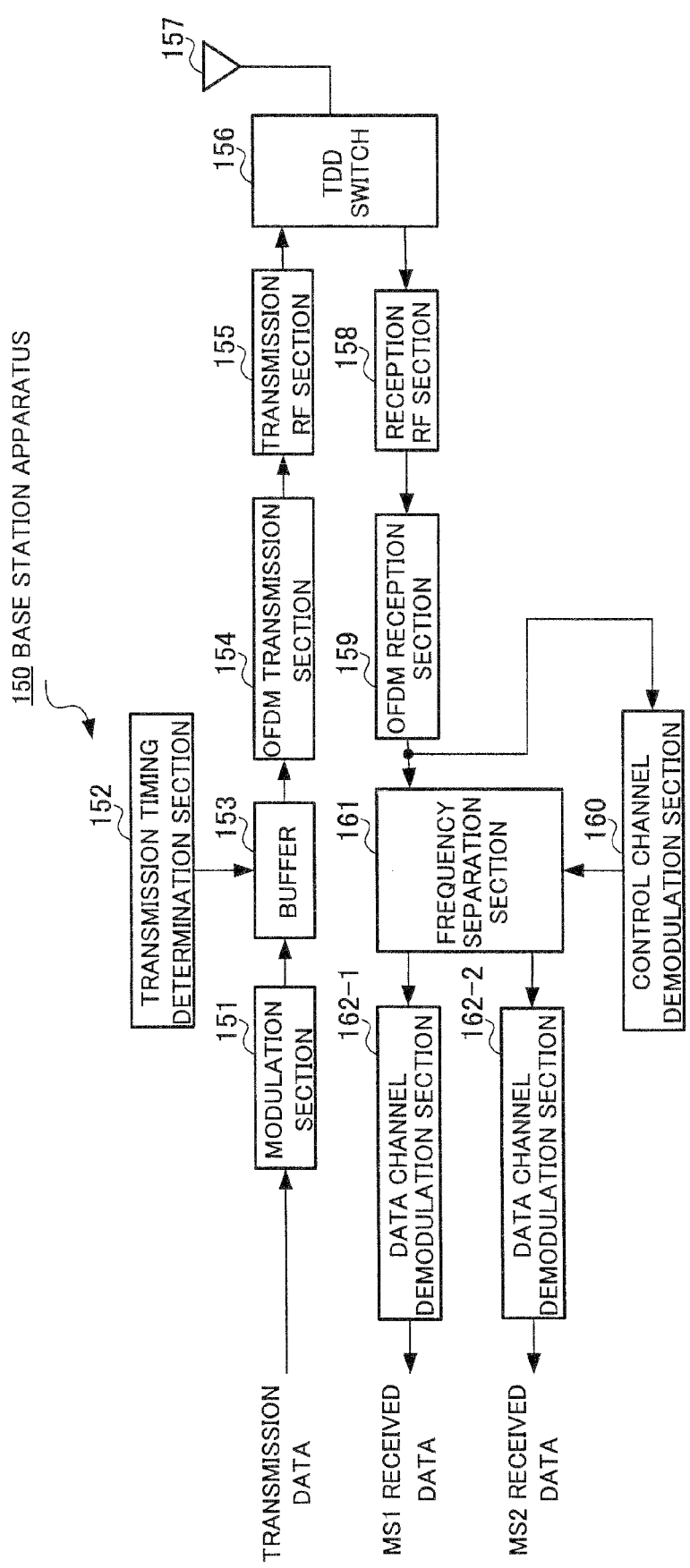
FIG. 10 is a block diagram showing a main configuration of a base station apparatus according to Embodiment 1.

FIG. 10 is a block diagram showing a main configuration of base station BS1 (base station apparatus 150) according to this embodiment.

Sections of this base station apparatus 150 implement the following operations:

Modulation section 151 performs predetermined modulation processing such as QPSK on transmission data. Transmission timing determination section 152 determines a transmission timing for mobile station MS1 in accordance with the uplink/downlink timing in the TDD system and reports this timing to buffer 153. Buffer 153 temporarily stores the modulation signal outputted from modulation section 151 and outputs the stored modulation signal to OFDM transmission section 154 based on the transmission timing of mobile station MS1 reported from transmission timing determination section 152. OFDM transmission section 154 performs predetermined OFDM transmission processing such as fast Fourier transform on the modulation signal and obtains a multicarrier baseband signal. Transmission RF section 155 performs predetermined radio transmission processing such as up-conversion on the baseband signal and transmits the obtained radio signal via TDD switch 156 and antenna 157.

On the other hand, reception RF section 158 performs predetermined radio reception processing such as down-conversion on the radio signal received via antenna 157 and TDD switch 156 and obtains a baseband signal. OFDM reception section 159 performs predetermined OFDM reception processing such as inverse fast Fourier transform on the baseband signal and obtains subcarrier signals from the multicarrier baseband signal. Control channel demodulation section 160 performs demodulation processing on the control channel transmitted from mobile station MS1, extracts information about the subcarriers used by mobile station MS1 (subcarriers for mobile station MS1) and available subcarriers, and outputs the information to frequency separation section 161. Frequency separation section 161 separates subcarrier signals by frequency based on the information about the subcarriers used by mobile station MS1 and the available subcarriers, and separates signals from mobile station MS1 from signals from mobile station MS2. Data channel demodulation sections 162-1 and 162-2 perform demodulation processing on the signals from mobile station MS1 and the signals from mobile station MS2, and obtains data from mobile station MS1 and data from mobile station MS2.

In this way, according to this embodiment, in the multihop system, relay station MS1 receives data that is requested to be relayed by another station (mobile station MS2 outside the area or base station BS1), and temporarily stores the data in the buffer. Then, after waiting until the timing for transmitting data of mobile station MS1, and, when this timing arrives, relay station MS1 frequency division multiplexes the stored relay data with the data of mobile station MS1, and transmits the frequency division multiplexed data to the relay destination station (base station BS1 or mobile station MS2). By this means, it is possible to relay communication of another station and suppress increase in power consumption of mobile station MS1.

Furthermore, in the above configuration, relay station MS1 judges whether or not there is a subcarrier that is not used by mobile station MS1 (available subcarrier) in OFDM frequencies, and maps relay data to this available subcarrier. By this means, without sacrificing data transmission of mobile station MS1, data relay of another station can be implemented.

In addition, when data relay is carried out, relay station MS1 may report the relay to mobile station MS2 outside the area. By this means, the following effects can be recognized.

Generally, since the mobile station constantly monitors the reception level of pilot signals transmitted from the base station, a user of the mobile station can judge whether or not the user is located within a cell. Therefore, though the user of mobile station MS2 according to this embodiment recognizes that the user is located outside the cell, the user tries to transmit data to base station BS1. In this situation, the user of mobile station MS2 may want to confirm whether or not data transmission is possible (or was possible). As a method for telling this user whether or not data transmission is possible, it is considered that mobile station MS2 searches for a relay station before data transmission, holds the relay station, and transmits data to this relay station. In this case, mobile station MS2 performs communication after holding the relay station, thereby naturally judging that data transmission is possible.

However, in this method, processing of searching for a relay station and holding this relay station requires signaling (exchanging control signals) with this relay station, and since this signaling is different from usual communication processing in the case in which the mobile station is located within the cell, a new signaling circuit is required. On the other hand, as described above, if relay station MS1 reports the data relay to mobile station MS2 when data relay is carried out, mobile station MS2 can judge that data transmission is possible with a simple configuration without signaling in advance. Then, by displaying the success of data transmission on a display or the like, this fact can be reported to the user of mobile station MS1. Furthermore, since relay station MS1 can report to mobile station MS2 outside the area simultaneously upon data transmission to base station BS1, transmission power does not increase markedly. Further, a signal transmitted by relay station MS1 to base station BS1 can be received by mobile station MS2, except for a case in which directivity is added and transmitted. Therefore, if this signal is used as the above-described report signal, relay station MS1 does not need to separately transmit a report signal to mobile station MS2.

Furthermore, in this embodiment, although a case has been described as an example in which relay station MS1 directly communicates with base station BS1, this is by no means limiting, and communication may be performed via another relay station between mobile station MS1 and base station BS1.

Furthermore, in this embodiment, although a case has been described as an example in which a relay station is one of mobile station MS1—that is, there is one communication route (relay route) of relay data—, there may be a plurality of relay routes. For example, two mobile stations—mobile station MS1 and mobile station MS1'—may relay data of mobile station MS2 outside the area. Then, if timings for transmitting relay data of two relay stations (uplink timings in the TDD system) are the same, from the viewpoint of base station BS1, data of mobile station MS2 outside the area seems to arrive through two communication paths, and the situation is practically equivalent to the situation of communication under the multipath environment. Furthermore, if transmission timings of two relay stations are different, from the viewpoint of base station BS1, the situation is practically equivalent to the situation in which mobile station MS2 retransmits data.

Furthermore, here, although a case has been described as an example in which data from mobile station MS2 located outside the cellular system is relayed, this is by no means limiting, and data from a mobile station that cannot receive a signal from base station BS1 located within the cell (mobile station located in a dead area), may be relayed. That is, the present invention is effective for measures against the dead area.

Furthermore, in an example of FIG. 3 and FIG. 8, although a case has been described as an example in which available subcarriers of the relay station are successive on the frequency axis, available subcarriers may be distributed unsuccessively and discretely.

Furthermore, in this embodiment, although a case has been described as an example in which, when the capacity of available subcarriers is insufficient for a data relay, mobile station MS1 does not perform a relay, mobile station MS1 may relay only part of data. Specifically, mobile station MS2 located outside the area assigns priorities in advance to data to be transmitted to base station BS1 based on data accuracy or the like. Then, mobile station MS2 transmits this data with priorities to relay station MS1. Relay station MS1 maps data in the order of descending priorities out of the received data to available subcarriers of relay station MS1, and at the stage at which mapping of all relay data is completed or available subcarriers are all filled, multiplexes the data with the data of relay station MS1 and transmits the multiplexed data to base station BS1. By this means, even when the size of the relay data is larger than the capacity of available subcarriers, data is selected in the order of descending priorities and relayed to base station BS1. Therefore, at base station BS1, although data accuracy is poor, a state can be maintained that is meaningful for communication (communication can be practically established.)

Embodiment 2

In Embodiment 1, a case has been described as an example in which the present invention is applied to an OFDM-TDD system, but in Embodiment 2, a case will be described in which the present invention is applied to an OFDM-FDD (Orthogonal Frequency Division Multiplex—Frequency Division Duplex) system. In the TDD system described in Embodiment 1, since the same frequency band is used in uplink relay and downlink relay, the relay station does not need to switch the frequencies to be used according to uplink or downlink. However, in the FDD system described in this embodiment, as the frequency band to be used is different between uplink and downlink, the configuration of the relay station substantially differs from Embodiment 1. The configuration of the relay station will be described later in detail.

Figure 11A:
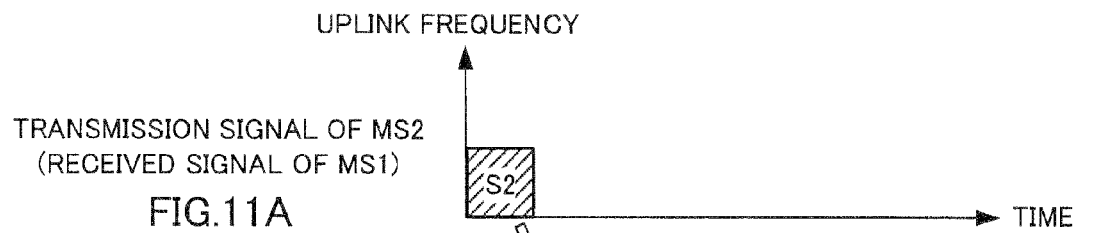
FIG. 11 illustrates a flow in a case in which a relay station relays data of a relay requesting station.
Figure 11B:
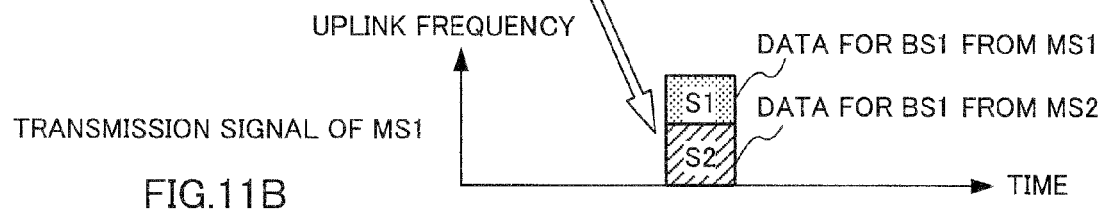

FIG. 11A and FIG. 11B illustrate a flow of a case in which relay station MS1 relays data of relay requesting station MS2. In addition, the assumed situation is the same as in FIG. 1, and mobile station MS1 within the cell relays uplink communication between mobile station MS2 located outside cell A1 and base station BS1. Signals are assigned the same reference numerals as in FIG. 1.

Relay station MS1 receives transmission signal S2 in the uplink frequency from relay requesting station MS2 at an arbitrary timing. Then, relay station MS1 temporarily stores the received signal in a buffer, and, at the timing of data transmission to base station BS1 of relay station MS1, by mapping data S2 from relay requesting station MS2 to available subcarrier, multiplexes data S1 of relay station MS1 with relay data S2 and transmits the multiplexed data. The timing at which relay station MS1 transmits relay data S2 to base station BS1 is irregular, and the time interval from relay station MS1 receiving relay data S2 to transmitting this data to base station BS1 is also irregular. Therefore, when a predetermined time passes while waiting for transmission of relay data S2, relay station MS1 cancels relay and discards relay data S2.

Figure 12:
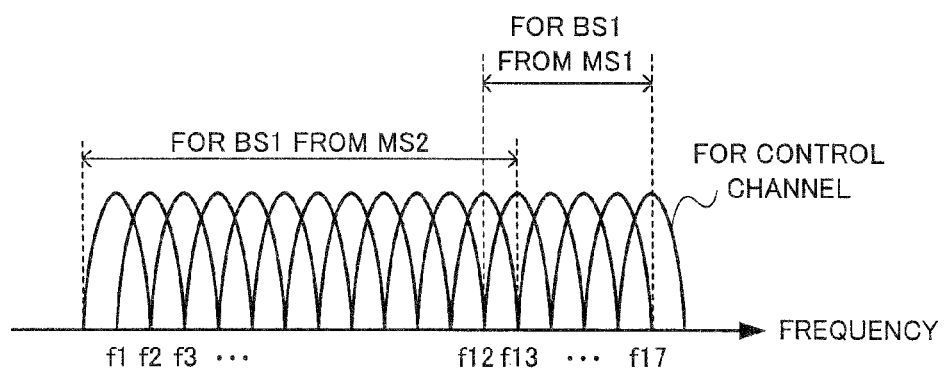
FIG. 12 shows an example of a usage state of transmission subcarriers for a relay station.

FIG. 12 is a view showing an example of a usage state of transmission subcarriers for relay station MS1.

Subcarriers of center frequencies f13 to f16 are used in transmission from relay station MS1 to base station BS1—that is, transmission of the data of relay station MS1—and the subcarriers of center frequencies f1 to f12 are available subcarriers. Then, relay station MS1 maps signal S2 received from relay requesting station MS2 to available subcarriers (center frequencies f1 to f12), and performs relay transmission to base station BS1.

In addition, relay data may be mapped to any subcarrier if a subcarrier is an available subcarrier, and, for example, when a successive plurality of subcarriers can be held as available subcarriers, relay data is mapped to these subcarriers. Furthermore, when available subcarriers are located separately one another—that is, located discretely—relay data is mapped discretely.

In addition, in FIG. 11 and FIG. 12, a case of uplink relay has been described as an example, but the present invention can be implemented by the same relay method in the case of downlink relay. Since this has been described in Embodiment 1, the explanation is omitted here.

Figure 13:
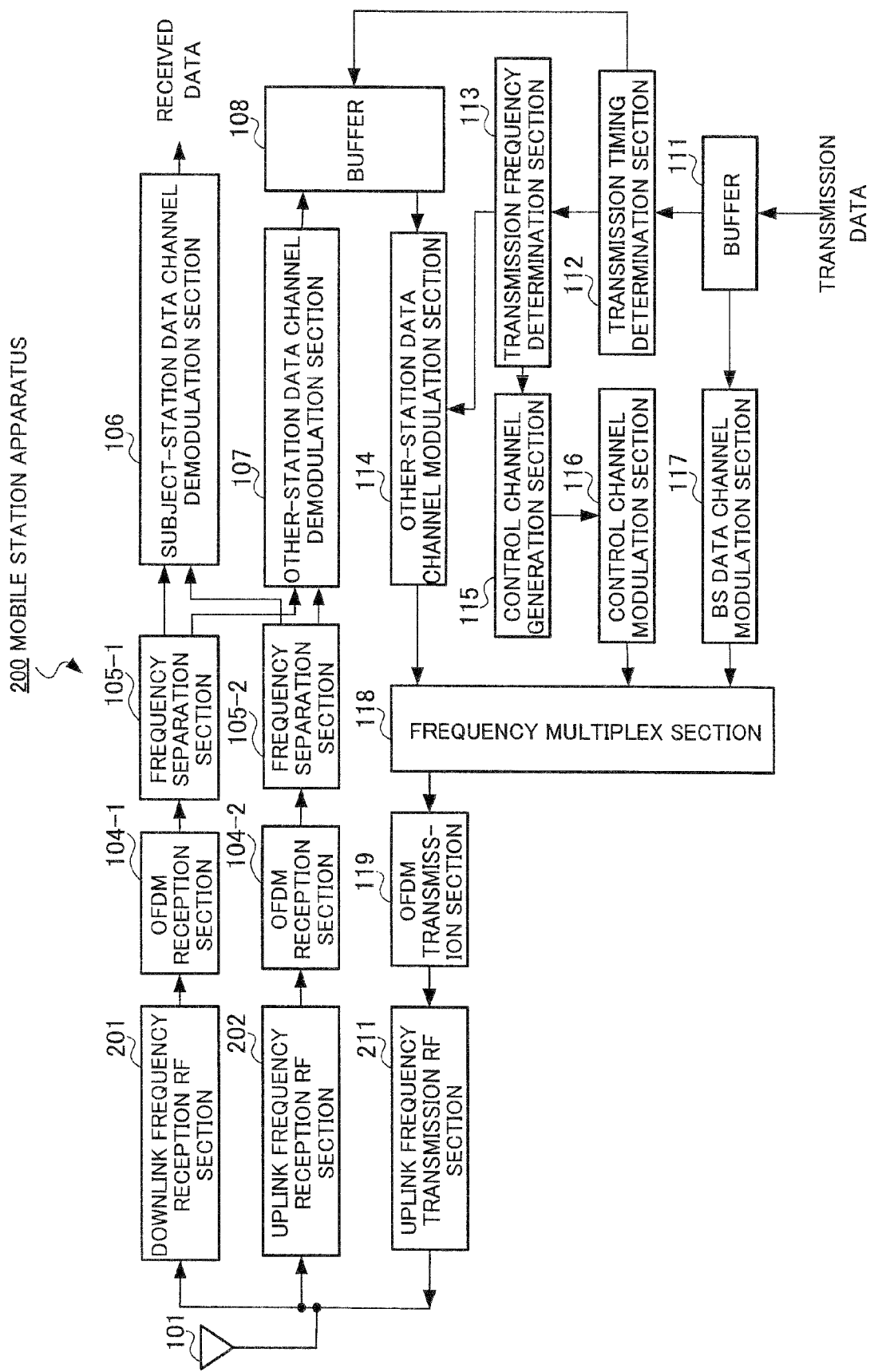
FIG. 13 is a block diagram showing a main configuration of a mobile station apparatus according to Embodiment 2.

FIG. 13 is a block diagram showing a main configuration of mobile station apparatus 200 according to this embodiment implementing the above-described operations. In addition, since mobile station apparatus 200 has the same configuration as mobile station apparatus 100 (refer to FIG. 9) described in Embodiment 1, components basically performing the same operation are assigned the same reference numerals without further explanations.

Furthermore, a plurality of components with the same configuration are indicated with branch numerals assigned after reference numerals.

One of the features of mobile station apparatus 200 is to have a function of receiving relay data for another station (for example, uplink frequency reception RF section 202, OFDM reception section 104-2 and frequency separation section 105-2) in addition to a normal reception function.

Function of each section of mobile station apparatus 200 will be described below.

Downlink frequency reception RF section 201 performs predetermined radio reception processing such as down-conversion on a downlink radio signal from base station BS1 received via antenna 101, that is, a radio signal of downlink frequency, and obtains a baseband signal. Data included in the radio signal of downlink frequency is normal communication data for mobile station MS2, or relay data for another station.

Uplink frequency reception RF section 202 performs predetermined radio reception processing such as down-conversion on a signal such as relay data from another station (for example, MS2) received via antenna 101—that is, a radio signal of uplink frequency—and obtains a baseband signal. Data included in the radio signal of uplink frequency is, as shown in FIG. 11 and FIG. 12, relay data of uplink relay for base station BS1 from another station. There is also a case in which, as described below, mobile station MS2 is a relay requesting station located outside the cell, and data is relay data of downlink relay transmitted from a relay station for mobile station MS2. Downlink relay will be described later in detail.

There are two OFDM reception sections 104 for downlink frequency and for uplink frequency (104-1 and 104-2). Furthermore, there are two frequency separation sections 105 for downlink frequency and for uplink frequency (105-1 and 105-2).

Subject-station data channel demodulation section 106 demodulates data for mobile station MS2 outputted from OFDM reception section 104-1 or OFDM reception section 104-2, and obtains data for mobile station MS2. Other-station data channel demodulation section 107 demodulates data for another station outputted from OFDM reception section 104-1 or OFDM reception section 104-2, and temporarily stores this demodulated data in buffer 108.

On the other hand, uplink frequency transmission RF section 211 performs predetermined radio transmission processing such as up-conversion on the baseband signal outputted from OFDM transmission section 119 and transmits the obtained radio signal of uplink frequency via antenna 101. Data included in the radio signal of uplink frequency is normal communication data to base station BS1 of mobile station MS2, or, as described below, relay data of uplink relay and downlink relay.

Figure 14:
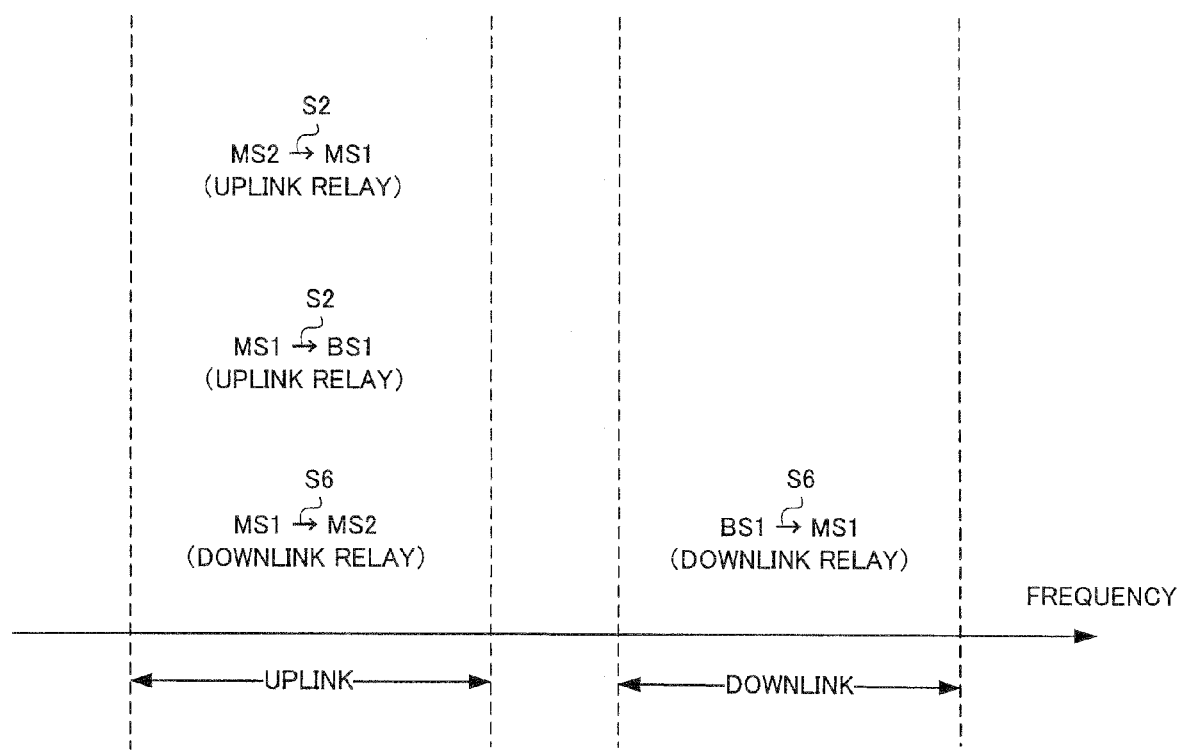
FIG. 14 is a view summarizing the usage methods of each frequency band in a communication system according to Embodiment 2.

FIG. 14 is a view summarizing the usage methods of each frequency band in the communication system according to this embodiment.

A case of uplink relay already described in FIG. 11 and FIG. 12 will be described.

In the case of uplink relay, transmission from relay requesting station MS2 to relay station MS1 (signal S2) is performed using uplink as in normal communication.

Furthermore, transmission from relay station MS1 to base station BS1 (signal S2) is performed using uplink as in normal communication. Therefore, frequency to be used is uplink frequency in either route.

Next, a case of downlink relay will be described.

In the case of downlink relay, transmission from base station BS1 to relay station MS1 (signal S6) is performed using downlink (downlink frequency) as in normal communication. However, transmission from relay station MS1 to relay requesting station MS2 (signal S6) is performed using uplink frequency, which is different from normal communication.

As already described, in the FDD system, since the frequency band to be used is different between uplink and downlink, the normal (conventional) mobile station apparatus cannot receive transmission data of another mobile station apparatus. However, as shown in FIG. 13, since mobile station apparatus 200 according to this embodiment has a reception system for uplink frequency (uplink frequency reception RF section 202 to frequency separation section 105-2), mobile station apparatus 200 can receive transmission data from another mobile station apparatus. That is, if relay station MS1 and relay requesting station MS2 both have the configuration of mobile station apparatus 200, relay requesting station MS2 can receive relay data transmitted from relay station MS1 using uplink frequency by the reception system for uplink frequency. Therefore, as shown in FIG. 14, downlink relay between mobile station apparatuses is performed using uplink frequency.

In addition, the relay station embeds an identifier in the transmission signal so that the transmission data can be identified as the data addressed to base station BS1 or the relay requesting station.

In this way, according to this embodiment, in the multihop system, relay station MS1 receives data that is requested to be relayed by another station (mobile station MS2 outside the area or base station BS1), and temporarily stores the data in a buffer. Then, after waiting until the timing for transmitting the data of mobile station MS2, and, when this timing arrives, relay station MS1 frequency division multiplexes the stored relay data with the data of mobile station MS1 and transmits the frequency division multiplexed data to a relay destination station (base station BS1 or mobile station MS2). By this means, it is possible to implement communication relay of another station and suppress increase in power consumption of mobile station MS1.

That is, since the relay station relays a signal of the relay requesting station only in the case in which there is a transmission signal of the relay station, it is possible to suppress power consumption.

In addition, in this embodiment, a case has been described as an example in which downlink relay between mobile stations (between the relay station and the relay requesting station) is performed using uplink frequency.

Figure 15:
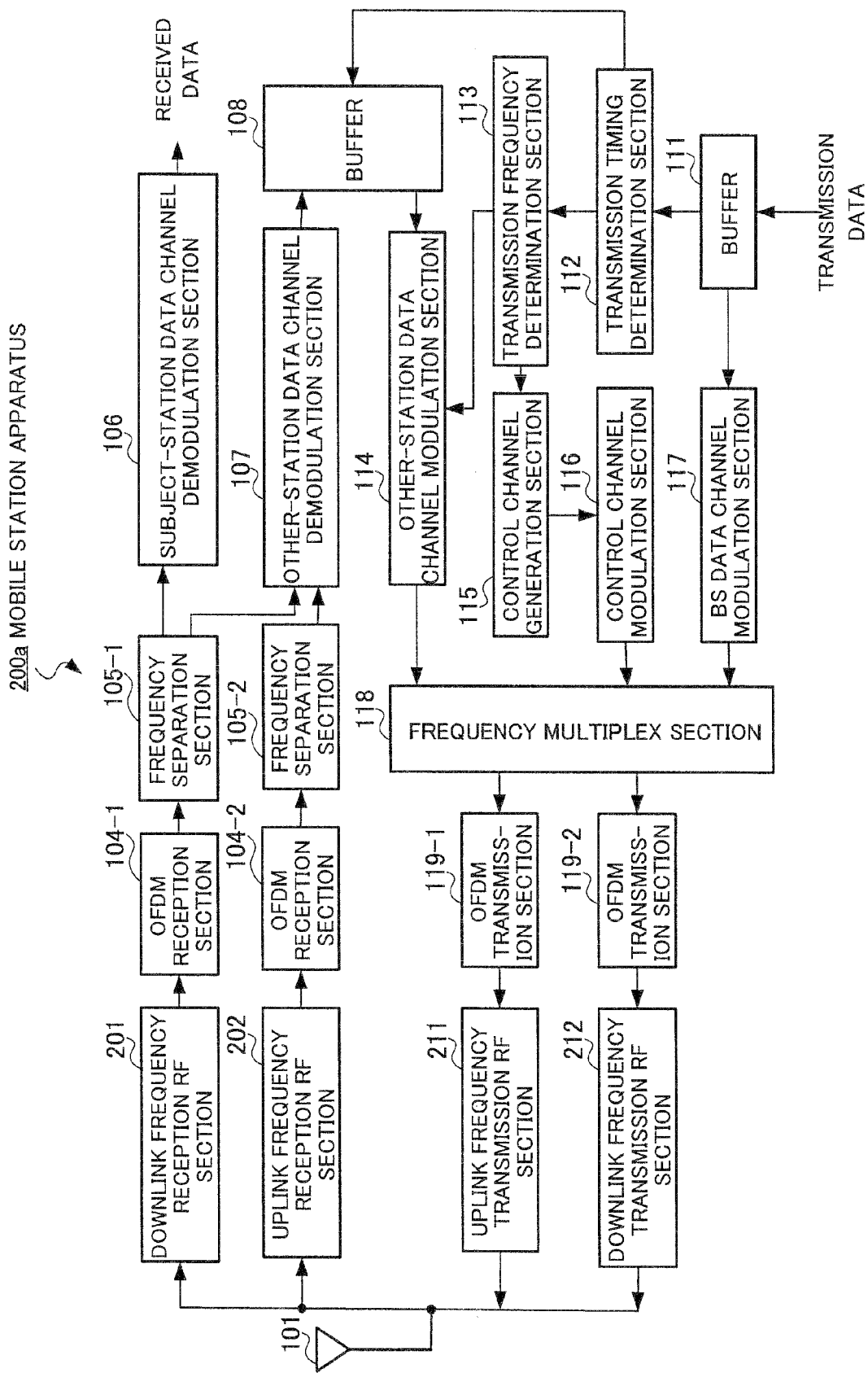
FIG. 15 is a block diagram showing variations of a mobile station apparatus according to Embodiment 2.

However, downlink relay may be performed using downlink frequency as in normal downlink communication. In this case, the configuration of mobile station apparatus 200a is as shown in FIG. 15. OFDM transmission section 119-2 and downlink frequency transmission RF section 212 are transmission systems performing downlink relay from the relay station to the relay requesting station. In this case, since there is no data for the mobile station in the radio signal of uplink frequency, frequency separation section 105-2 separates (extracts) only relay data for another station and outputs the data to other-station data channel demodulation section 107.

Furthermore, when relay station MS1 carries out data relay, relay station MS1 may report the data relay to mobile station MS2 outside the area.

Furthermore, in this embodiment, a case has been described as an example in which relay station MS1 directly communicates with base station BS1, but this is by no means limiting, and relay station MS1 may communicate via another relay station between mobile station MS1 and base station BS1.

Further, in this embodiment, a case has been described as an example in which there is one relay route, but there may be a plurality of relay routes.

Still further, in this embodiment, a case has been described as an example in which data from mobile station MS2 located outside the cellular system is relayed, but data from a mobile station located in a dead area may be relayed.

The embodiments of the present invention have been described.

The mobile station apparatus and communication relay method according to the present invention are not limited to the above-described embodiments and can be implemented by making various changes. For example, the embodiments can be appropriately combined and implemented.

In addition, in the above-described embodiments, although cases have been described as an example in which a mobile station apparatus such as a mobile telephone is used as a relay station or a relay requesting station, other communication terminals, for example, a PDA (Personal Digital Assistant) or a laptop computer can be used.

Furthermore, although a case has been described as an example in which the present invention is implemented with hardware, the present invention can be implemented with software. For example, by describing the communication relay method algorithm according to the present invention in a programming language, storing this program in a memory and making an information processing section execute this program, it is possible to implement the same function as the mobile station apparatus and communication terminal apparatus of the present invention.

Furthermore, each function block used to explain the above-described embodiments is typically implemented as an LSI constituted by an integrated circuit. These may be individual chips or may partially or totally contained on a single chip.

Furthermore, here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application in biotechnology is also possible.

The present application is based on Japanese Patent Application No. 2004-068793, filed on Mar. 11, 2004, and Japanese Patent Application No. 2005-56381, filed on Mar. 1, 2005, the entire content of which is expressly incorporated by reference herein.

INDUSTRIAL APPLICABILITY

The communication terminal apparatus and communication relay method according to the present invention have the effect of implementing communication relay of another station and suppressing increase in power consumption of the communication terminal apparatus, and can be applied to a multihop system and the like.

The invention claimed is:
1. A relay station apparatus comprising:
a reception section that receives first communication data between a first communication apparatus and a second communication apparatus; and
a transmission section that operates to multiplex the first communication data upon with second communication data originating from the relay station and to be transmitted from the relay station apparatus to the second communication apparatus as multiplexed data and transmit the multiplexed data, only when the relay station apparatus has the second communication data to be transmitted from the relay station apparatus to the second communication apparatus and a timing to transmit the second communication data arrives.

2. The relay station apparatus according to claim 1, further comprising:
a multiplexing section that performs frequency division multiplexing by mapping the first communication data between the first communication apparatus and the second communication apparatus to an available subcarrier to which the second communication data to be transmitted from the relay station apparatus is not mapped.

3. The relay station apparatus according to claim 2, wherein when a number of transmission subcarriers to map the second communication data to be transmitted from the relay station apparatus is one or more, the multiplexing section performs the multiplexing of the first communication data upon the second communication data to be transmitted from the relay station apparatus.

4. The relay station apparatus according to claim 2, wherein when a capacity of the available subcarrier is smaller than a size of the first communication data, the multiplexing section does not map the first communication data to the available subcarrier.

5. The relay station apparatus according to claim 2, wherein when a capacity of the available subcarrier is smaller than a size of the first communication data, the multiplexing section maps a part of the first communication data to the available subcarrier in a descending order of priority.

6. The relay station apparatus according to claim 1, wherein the transmitting section comprises a reporting section that reports, to the first communication apparatus or the second communication apparatus that requests a relay of the first communication data, information indicating that the first communication data is transmitted between the first communication apparatus and the second communication apparatus.

7. The relay station apparatus according to claim 1, further comprising:
   a buffer that stores the first communication data, wherein:
      when a waiting time of the first communication data exceeds a predetermined time, the buffer discards the first communication data and the transmission section does not transmit the first communication data.

8. A relay station apparatus comprising:
   a reception section that receives first communication data to transmit from a first communication apparatus to a second communication apparatus; and
   a transmission section that, (i) when the relay station apparatus has second communication data originating from the relay station and to be transmitted from the relay station apparatus to the second communication apparatus and a timing to transmit the second communication data arrives, operates to multiplex the first communication data upon the second communication data to be transmitted from the relay station apparatus and to transmit the multiplexed data, and (ii) when the relay station apparatus does not have the second communication data to be transmitted from the relay station apparatus to the second communication apparatus within the timing to transmit the second communication data to the second communication apparatus, the relay station apparatus temporarily stores first communication data until a first timing to transmit the first communication data and the second communication data to the second communication apparatus.

9. The relay station apparatus according to claim 8, wherein upon the expiration of a predetermined timing, the transmission section discards the first communication data.

10. A relay method performed by a relay station apparatus, comprising:
   receiving first communication data between a first communication apparatus and a second communication apparatus; and
   only when the relay station apparatus has second communication data originating from the relay station and to be transmitted from the relay station apparatus to the second communication apparatus and a timing to transmit the second communication data arrives, multiplexing the first communication data upon the second communication data of the relay station apparatus and transmitting the multiplexed data.

* * * * *